US012702992B2

(12) United States Patent
Fogueteiro et al.

(10) Patent No.: US 12,702,992 B2
(45) Date of Patent: Aug. 11, 2026

(54) ASSEMBLY COMPRISING A BOTTLE, AN AESTHETIC CAP AND A SYSTEM FOR ATTACHING THE AESTHETIC CAP

(71) Applicant: CHANEL PARFUMS BEAUTE, Neuilly-sur-Seine (FR)

(72) Inventors: Paulo Fogueteiro, Neuilly-sur-Seine (FR); Floriane Peronne, Neuilly-sur-Seine (FR); Guillaume Savoye, Neuilly-sur-Seine (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 281 days.

(21) Appl. No.: 18/663,866

(22) Filed: May 14, 2024

(65) Prior Publication Data

US 2024/0382988 A1 Nov. 21, 2024

(30) Foreign Application Priority Data

May 17, 2023 (FR) ....................................... 2304931

(51) Int. Cl.
*B05B 11/00* (2023.01)
*B05B 11/10* (2023.01)

(52) U.S. Cl.
CPC ...... *B05B 11/0037* (2013.01); *B05B 11/1047* (2023.01)

(58) Field of Classification Search
None
See application file for complete search history.

(56) References Cited

U.S. PATENT DOCUMENTS

| | | | | |
|---|---|---|---|---|
| 3,120,328 | A * | 2/1964 | Corsette | B05B 11/1047 222/153.09 |
| 6,053,363 | A * | 4/2000 | Revenu | B05B 11/0038 222/88 |
| 11,261,009 | B2 * | 3/2022 | Thorez | B65D 47/00 |
| 11,471,903 | B2 * | 10/2022 | El Hassain | B05B 11/0038 |
| 12,138,644 | B2 * | 11/2024 | Moretti | B05B 11/0038 |

(Continued)

FOREIGN PATENT DOCUMENTS

| | | | |
|---|---|---|---|
| EP | 4116215 | A1 | 1/2023 |
| WO | 2020/115399 | A1 | 6/2020 |

(Continued)

OTHER PUBLICATIONS

Nov. 21, 2023 Search Report issued in French Patent Application No. 2304931.

*Primary Examiner* — Paul R Durand
*Assistant Examiner* — Michael J. Melaragno
(74) *Attorney, Agent, or Firm* — Williams Mullen; R. Brian Drozd

(57) ABSTRACT

An assembly that includes a bottle with a neck, a dispensing unit with a reservoir in the bottle and a dispensing mechanism, wherein the dispensing unit has at least one groove, an aesthetic cap positioned on the neck and comprising a first plate and a first external skirt, and an attachment system secured to the aesthetic cap. The attachment system includes a second plate between the neck and the first plate, an internal skirt between the neck and the dispensing mechanism, a second external skirt between the neck and the first external skirt, and holding lugs secured to the internal skirt and which extend inwards to be housed in a groove.

6 Claims, 5 Drawing Sheets

(56) References Cited

U.S. PATENT DOCUMENTS

| | | | | |
|---|---|---|---|---|
| 12,377,426 | B2 * | 8/2025 | Lafosse | B05B 11/1049 |
| 2004/0140325 | A1 * | 7/2004 | Flaig | B65D 25/20<br>222/321.7 |
| 2015/0320175 | A1 * | 11/2015 | Lee | B65D 51/32<br>222/372 |
| 2017/0000237 | A1 * | 1/2017 | Lefevre | A45D 34/00 |
| 2019/0060929 | A1 * | 2/2019 | Delmon | B05B 11/1047 |
| 2022/0023901 | A1 * | 1/2022 | El Hassain | B05B 11/0054 |
| 2024/0342736 | A1 * | 10/2024 | Delbove | B05B 11/0038 |
| 2024/0382988 | A1 * | 11/2024 | Fogueteiro | B05B 11/0037 |
| 2025/0009109 | A1 * | 1/2025 | Fogueteiro | A45D 34/00 |
| 2025/0100744 | A1 * | 3/2025 | Crapet | B65D 35/10 |

FOREIGN PATENT DOCUMENTS

| | | | |
|---|---|---|---|
| WO | 2021/079060 | A1 | 4/2021 |
| WO | 2023/030709 | A1 | 3/2023 |
| WO | 2023/089246 | A1 | 5/2023 |

* cited by examiner

[Fig. 1]
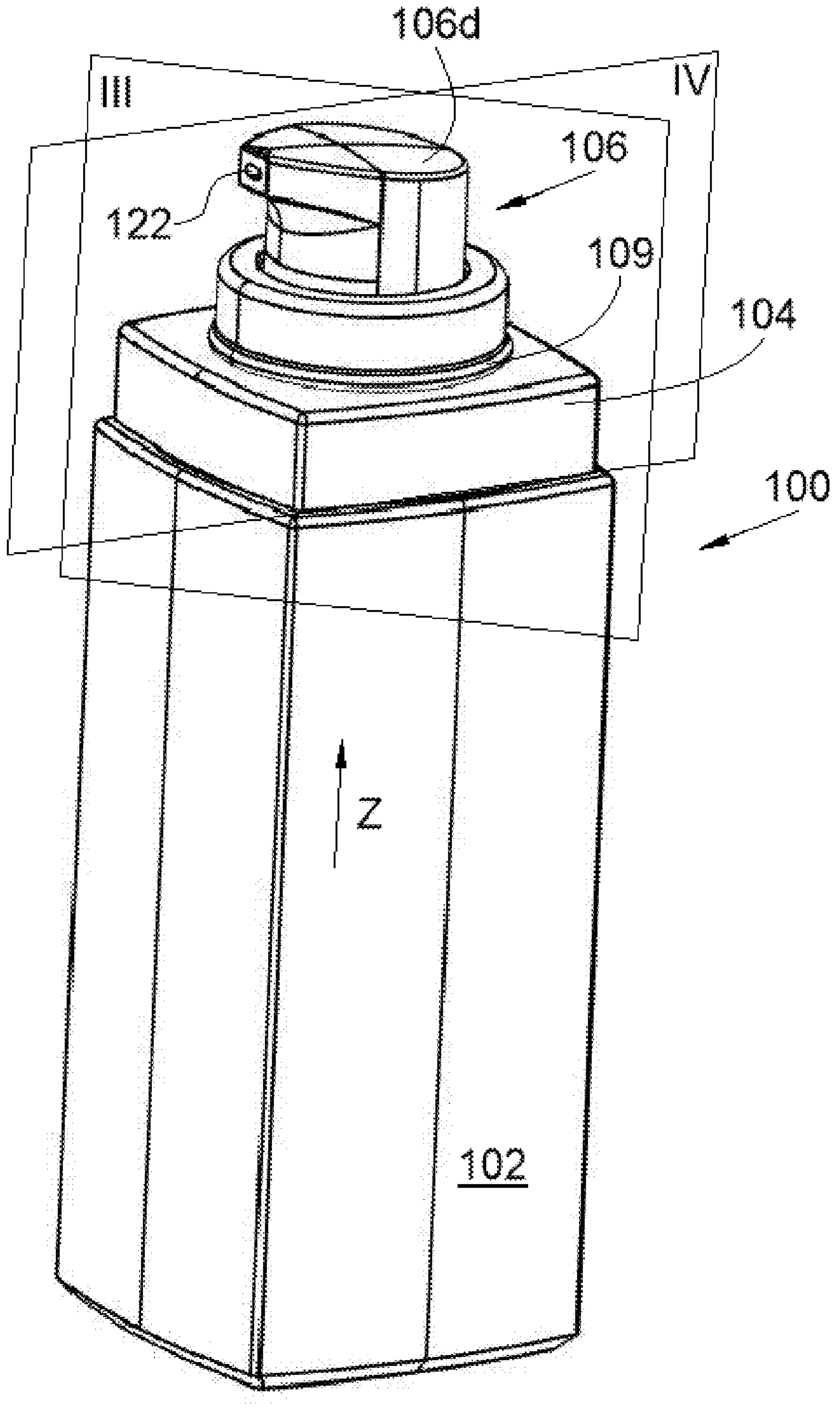

[Fig. 2]
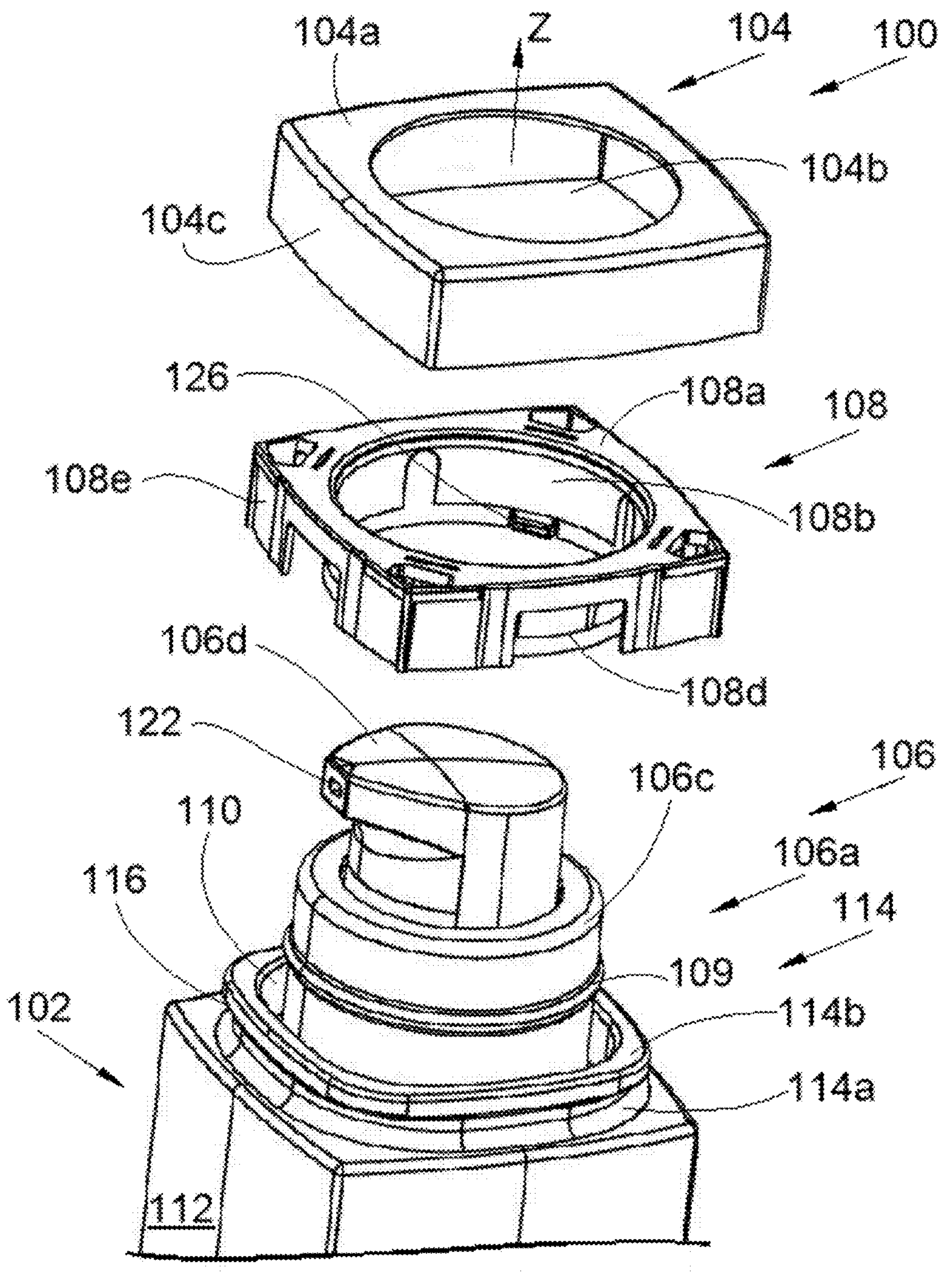

[Fig. 3]
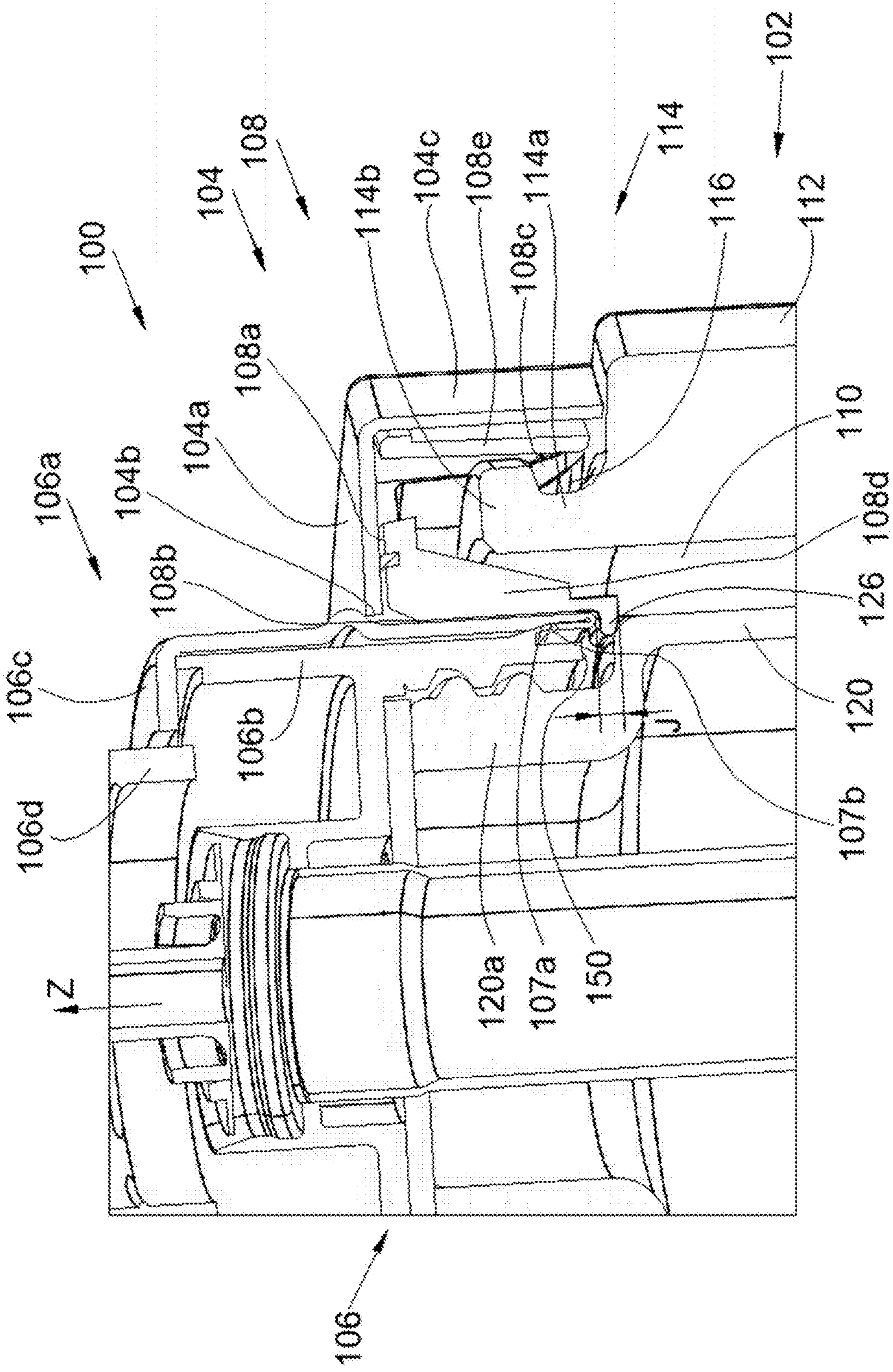

[Fig. 4]
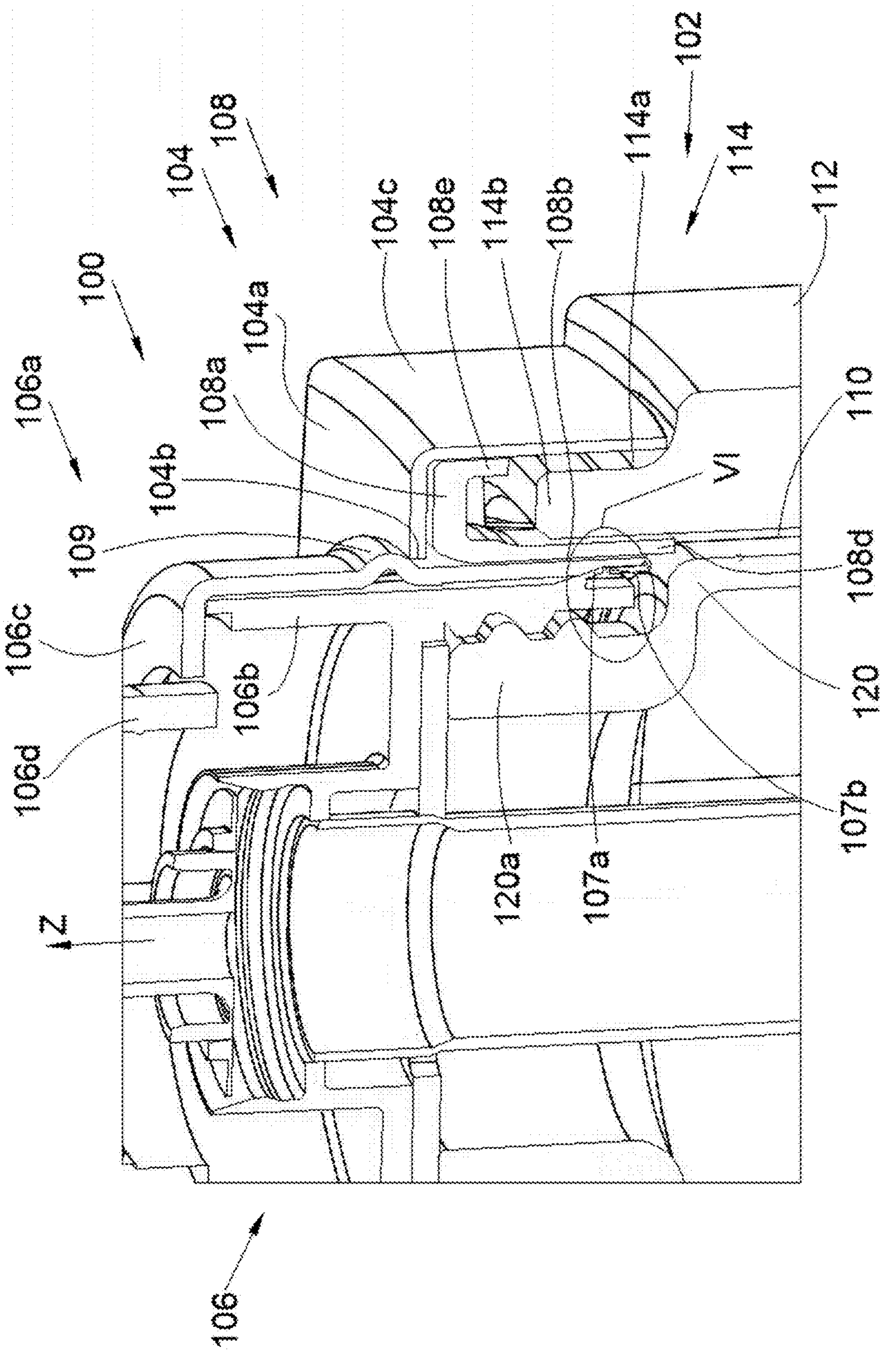

[Fig. 5]
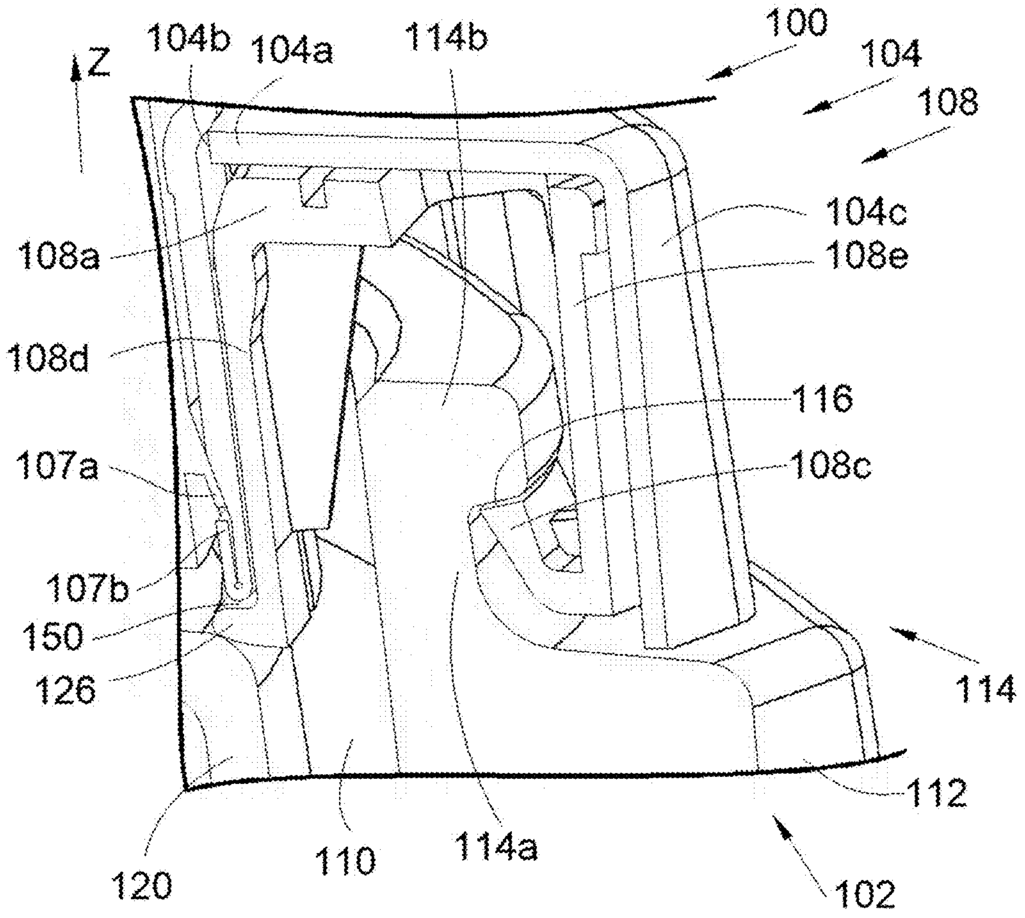
[Fig. 6]
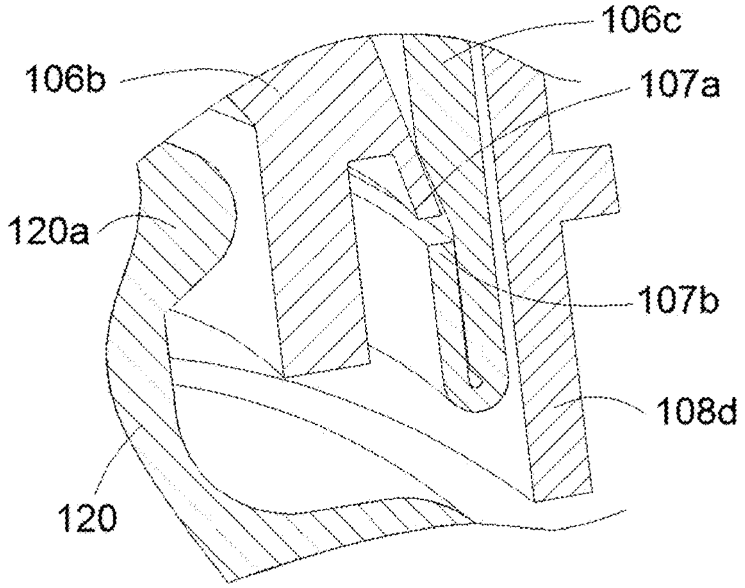

ASSEMBLY COMPRISING A BOTTLE, AN AESTHETIC CAP AND A SYSTEM FOR ATTACHING THE AESTHETIC CAP

TECHNICAL FIELD

The present invention relates to the general field of bottles for dispensing fluid products, such as creams. The invention relates to an assembly comprising a bottle with a neck, an aesthetic cap that is positioned around the neck and an attachment system that secures the aesthetic cap.

PRIOR ART

Currently there are assemblies that comprise a bottle with a dispensing mechanism, such as for example a pump actuated by a hand of a user.

To conceal the neck of the bottle and part of the dispensing mechanism, placing an aesthetic cap around the neck is known.

For aesthetic reasons, in particular, in the context of dispensing a cosmetic product of the beauty product type, using bottles the neck of which has a rectangular cross-section is known.

In order to secure the aesthetic cap to the neck, the latter is surmounted by a rim that provides the securing of the aesthetic cap to the neck.

Although such an arrangement gives good results, it is desirable to find a different arrangement that is simpler to implement.

DISCLOSURE OF THE INVENTION

One object of the present invention is to propose an assembly comprising a bottle with a neck, an aesthetic cap that is positioned around the neck and an attachment system that secures the aesthetic cap, and where the attachment system has a particular form allowing easy implementation.

For this purpose, an assembly having a vertical direction is proposed, comprising:

- a bottle comprising a hollow body and a neck at the top of the hollow body,
- a dispensing unit comprising a reservoir housed in the bottle and intended to contain a product, and a dispensing mechanism secured to the reservoir and intended to discharge said product from the reservoir, where said dispensing unit has at least one groove,
- an aesthetic cap comprising a first plate passed through by a first window through which the dispensing mechanism passes and a first external skirt extending downwards from the external periphery of the first plate, where the aesthetic cap is positioned on the neck, and
- an attachment system secured to the aesthetic cap and comprising:
- a second plate passed through by a second window through which the dispensing mechanism passes and positioned between the neck and the first plate of the aesthetic cap,
- an internal skirt extending downwards from the internal periphery of the second plate and in which the dispensing mechanism is housed, where the internal skirt is between the neck and the dispensing mechanism,
- a second external skirt extending downwards from the external periphery of the second plate, where the second external skirt is between the neck and first external skirt, and
- holding lugs secured to the internal skirt and which extend roughly perpendicularly to the vertical direction and inwards, where each holding lug is housed in a groove.

According to one particular embodiment, each groove is produced on the circumference of the reservoir.

According to another particular embodiment, the dispensing mechanism comprises a stopper secured to the reservoir and each groove is defined between the reservoir and the stopper.

Advantageously, the dispensing mechanism comprises a stopper secured to the reservoir, the stopper comprises an internal stopper and an external stopper secured to the internal stopper, the internal stopper comprises lugs that extend outwards and downwards, the external stopper comprises, for each lug, a counter-lug that extends inwards and upwards, and the counter-lugs are pressed in beyond the lugs and each lug and the associated counter-lug come vertically facing each other.

Advantageously, the external perimeter of the neck takes the form of a rectangle with four rounded corners, at each corner and on the top of the neck said neck divides into a bottom part extending upwards from the hollow body and a top part extending upwards from the bottom part, at each corner the bottom part has a recess towards the inside to form a shoulder under the top part, the attachment system comprises four attachment lugs secured to the second plate and each attachment lug is positioned under one of the shoulders of the neck.

Advantageously, the dispensing unit has a peripheral gadroon in abutment on the first plate and the diameter of which is greater than the diameter of the first window, and each holding lug is positioned so as to be in abutment against a bottom edge of the associated groove.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 1 is a perspective view of an assembly according to the invention,

FIG. 2 is an exploded perspective view of the bottle of FIG. 1 according to the invention, FIG. 3 is a view in cross section along the plane III of FIG. 1, FIG. 4 is a view in cross section along the plane IV of FIG. 1, FIG. 5 is a view in cross section along the plane III of FIG. 1 from another viewpoint, and FIG. 6 is an enlargement of the detail VI of FIG. 4.

DETAILED DISCLOSURE OF EMBODIMENTS

FIG. 1 shows an assembly 100 according to the invention. This assembly 100 comprises a bottle 102, an aesthetic cap 104 and a dispensing mechanism 106 that here takes the form of a manual pump activated by a hand of the user and which is immersed in a reservoir (120, FIG. 3).

In the following description, the terms relating to a position are taken with reference to an assembly 100 in the normal position of use, i.e. as shown on FIG. 1. In the following description, and by convention, the vertical direction oriented positively upwards is called Z.

FIG. 2 shows the assembly 100 in which the aesthetic cap 104 has been lifted and FIGS. 3 to 5 show cross sections of the assembly 100.

The assembly 100 comprises a dispensing unit that comprises the reservoir 120 and the dispensing mechanism 106 secured to the reservoir 120.

The bottle 102 comprises a hollow body 112 and a neck 114 that is secured to the hollow body 112 and at the top of the latter. The neck 114 delimits an orifice 110 for access to the interior of the hollow body 112 through which the dispensing mechanism 106 passes which is connected to the reservoir 120 housed in the hollow body 112. The reservoir 120 can contain any type of fluid product such as for example a cream, and the dispensing mechanism 106 is provided for capturing the fluid product contained in the reservoir 120 and for discharging it from the reservoir 120 towards the outside through a hole 122 provided for this purpose at the dispensing mechanism 106. The means of the dispensing mechanism 106 that make it possible to transport the fluid from the reservoir 120 to the hole 122 are not described any further since they do not directly form part of the scope of the invention and can take various forms known to a person skilled in the art.

In the description, the orifice 110 and the various windows that are described above and below are coaxial in the vertical direction Z.

The aesthetic cap 104 comprises a first plate 104*a* that extends horizontally and has passing through it a first window 104*b* through which the dispensing mechanism 106 passes.

The aesthetic cap 104 also comprises a first external skirt 104*c* extending downwards from the external periphery of the first plate 104*a*, i.e. the external edge of the first plate 104*a*.

The aesthetic cap 104 is positioned on the neck 114.

The assembly 100 also comprises an attachment system 108 that is secured to the aesthetic cap 104 and provides securing thereof to the neck 114 of the bottle 102 and which, in the assembled position, is housed inside the aesthetic cap 104 and outside the dispensing mechanism 106. Here the attachment system 108 consists of a part made from moulded plastics material, but it can be produced from any materials having the appropriate physical properties, in particular it can be produced in 3D printing.

The attachment system 108 comprises a second plate 108*a* that extends horizontally and has passing through it a second window 108*b* through which the dispensing mechanism 106 passes.

The attachment system 108 also comprises an internal skirt 108*d* that is secured to the second plate 108*a*, and which extends downwards from the internal periphery of the second plate 108*a*, i.e. from the edge of the second window 108*b*, thus delimiting, from the second window 108*b*, a well in which the dispensing mechanism 106 is housed.

The attachment system 108 also comprises a second external skirt 108*e* secured to the second plate 108*a* and extending downwards from the external periphery of the second plate 108*a*, i.e. the external edge of the second plate 108*a*. The second external skirt 108*e* is applied against the internal face of the first external skirt 104*c*.

In the assembled position, the attachment system 108 is housed inside the aesthetic cap 104 and overlaps the neck 114 so that the second plate 108*a* is located between the neck 114 and the first plate 104*a* of the aesthetic cap 104 and so that the internal skirt 108*d* is between the neck 114 and the dispensing mechanism 106 and the second external skirt 108*e* is between the neck 114 and the first external skirt 104*c*.

The aesthetic cap 104 is secured to the attachment system 108 by any suitable securing means. According to a particular embodiment, the securing is provided by a tight fit between the first external skirt 104*c* and the second external skirt 108*e*. According to another particular embodiment, the securing is provided by gluing. According to another particular embodiment, the securing is provided by a tight fit between the first external skirt 104*c* and the second external skirt 108*e* and by gluing.

To hold the reservoir 120 when it is disposed in the bottle 102, the assembly 100 comprises holding lugs 126 that are secured to the internal skirt 108*d* and extend roughly perpendicularly to the vertical direction Z and inwards, i.e. opposite to the neck 114 and therefore in the direction of the reservoir 120.

The dispensing unit has at least one groove 150 that extends over the circumference of said dispensing unit and is open towards the outside, i.e. towards the bottle 102.

In the assembled position, each holding lug 126 is housed in a groove 150 so as to lock the reservoir 120 with respect to the bottle 102. The holding lugs 126 therefore do not exert any radial force on the reservoir 120 or on the dispensing unit but only a locking force that prevents the movement of the reservoir 120 parallel to the vertical direction Z, unless a traction force is exerted on the reservoir that exceeds the locking force and causes the retraction of the holding lugs 126 to allow the reservoir 120 to pass, for example for filling or replacement thereof.

Each holding lug 126 thus comes into abutment downwards against the bottom edge of the groove 150 and upwards against a top edge of the groove 150.

With such an arrangement, use is easy.

According to one particular embodiment, each groove is produced on the circumference of the reservoir 120.

In the embodiment of the invention presented in FIGS. 2 to 5, the dispensing mechanism 106 comprises a stopper 106*a* that is secured to a spout 120*a* of the reservoir 120, here by screwing.

The reservoir 120 and the stopper 106*a* are arranged so as to have between them a vertical clearance J, i.e. parallel to the vertical direction Z, and each groove 150 is thus defined between the reservoir 120 and the stopper 106*a* and is delimited, at the clearance J, at the top by the stopper 106*a* and at the bottom by the reservoir 120. Each holding lug 126 thus comes into abutment downwards against the reservoir 120 and upwards against the stopper 106*a*.

The clearance J is determined here between the bottom part of the stopper 106*a* and a shoulder of the reservoir 120, where the shoulder forms a narrowing to join the spout 120*a*.

In the embodiment of the invention presented here, the stopper 106*a* comprises an internal stopper 106*b* and an external stopper 106*c* secured to the internal stopper 106*b*, here by snapping on.

The internal stopper 106*b* comprises a tapping for securing to a thread on the spout 120*a* of the reservoir 120.

The dispensing mechanism 106 also here comprises a pushbutton 106*d* in which the hole 122 is produced. The pushbutton 106*d* is mounted inside the stopper 106*a* and a user presses the pushbutton 106*d* to operate the dispensing mechanism 106.

The internal stopper 106*b* comprises lugs 107*a* that are seen best in FIG. 6. The lugs 107*a* extend, here from a skirt of the internal stopper 106*b*, outwards and downwards, and the external stopper 106*c* comprises, for each lug 107*a*, a counter-lug 107*b* that extends inwards and upwards, here from a skirt of the external stopper 106*c*. Thus, when the external stopper 106*c* is fitted on the internal stopper 106*b*, the counter-lugs 107*a* are pressed in beyond the lugs 107*a* and each lug 107*a* and the associated counter-lug 107*b* then come vertically facing each other to prevent upward removal of the external stopper 106*c*.

In the embodiment of the invention presented here, it is the stopper 106*a* that passes through the first window 104*b*, the second window 108*b* and the internal skirt 108*d*, and more particularly here the external stopper 106*c*.

In the embodiment of the invention presented here, the attachment system 108 is housed outside the stopper 106*a* and more particularly here the external stopper 106*c*.

In the assembled position, the internal skirt 108*d* is between the neck 114 and the stopper 106*a* (here the external stopper 106*c*).

In the plane of the orifice 110 which is here perpendicular to the vertical direction Z, the external perimeter of the neck 114 here takes the form of a rectangle with four rounded corners, and more particularly here a square with four rounded corners. In the same manner, the aesthetic cap 104 also takes the form of a rectangle when it is seen in the vertical direction Z. The rectangular form of the external perimeter of the neck 114 and the rectangular form of the aesthetic cap 104 limit the risks of rotation of the aesthetic cap 104 about the vertical direction Z.

At each corner and over the height of the neck 114, said neck 114 is divided into a bottom part 114*a* and a top part 114*b*. The bottom part 114*a* extends upwards from the hollow body 112 and the top part 114*b* extends upwards from the bottom part 114*a*.

At each corner, the bottom part 114*a* has an inward recess 116, i.e. the top part 114*b* overhangs the recess 116 while thus defining a shoulder under the top part 114*b*. The recess 116 is present here only at the corners, which makes it possible to reduce the thickness of the neck 114 between two corners. The angular extent about the vertical direction Z of the recess 116 is for example 20° on either side of the corner.

In the assembled position, the aesthetic cap 104 is positioned on the neck 114 and the first external skirt 104*c* descends as far as the hollow body 112.

The attachment system 108 also comprises attachment lugs 108*c* (here four in number) secured to the second plate 108*a* and more particularly here to the second external skirt 108*e*.

Each attachment lug 108*c* is arranged so that, in the assembled position, it is positioned under one of the shoulders of the neck 114, i.e. in one of the recesses 116, to provide the securing of the attachment system 108 to the neck 114. Each attachment lug 108*c* is oriented perpendicularly to the vertical direction Z and inwards.

The dispensing unit 106, here the external stopper 106*c*, has a gadroon 109 that forms a peripheral external relief around the external stopper 106*c* and in abutment on the first plate 104*a* and the diameter of which with respect to the vertical direction Z is greater than the diameter of the first window 104*b*. Such a gadroon 109 makes it possible to stop the pressing in of the dispensing unit with respect to the first plate 104*a*, in particular when the bottom of the reservoir 120 does not touch the bottom of the hollow body 112. On the other hand, when the reservoir 120 and the hollow body 112 are sized so that the bottom of the reservoir 120 touches the bottom of the hollow body 112 when it is in position, then the gadroon 109 is not obligatory.

The position of each holding lug 126 is such that, when the dispensing unit is resting on the first plate 104*a* by means of the gadroon 109, each holding lug 126 is in abutment against the bottom edge of the associated groove 150, here the shoulder of the reservoir 120, which causes the appearance of an abutment force that presses the dispensing unit downwards and thus holds the reservoir 120.

The invention claimed is:

1. An assembly having a vertical direction and comprising:

a bottle comprising a hollow body and a neck at the top of the hollow body, a dispensing unit comprising a reservoir housed in the bottle and intended to contain a product, and a dispensing mechanism secured to the reservoir and intended to discharge said product from the reservoir, where said dispensing unit has at least one groove, an aesthetic cap comprising a first plate passed through by a first window through which the dispensing mechanism passes and a first external skirt extending downwards from the external periphery of the first plate, where the aesthetic cap is positioned on the neck, and an attachment system secured to the aesthetic cap and comprising:

a second plate passed through by a second window through which the dispensing mechanism passes and positioned between the neck and the first plate of the aesthetic cap, an internal skirt extending downwards from the internal periphery of the second plate and in which the dispensing mechanism is housed, where the internal skirt is between the neck and the dispensing mechanism, a second external skirt extending downwards from the external periphery of the second plate, where the second external skirt is between the neck and first external skirt, and holding lugs secured to the internal skirt and which extend roughly perpendicularly to the vertical direction and inwards, where each holding lug is housed in a groove.

2. The assembly according to claim 1, wherein in that each groove is produced on the circumference of the reservoir.

3. The assembly according to claim 1, wherein the dispensing mechanism comprises a stopper secured to the reservoir and wherein each groove is defined between the reservoir and the stopper.

4. The assembly according to claim 1, wherein the dispensing mechanism comprises a stopper secured to the reservoir, wherein the stopper comprises an internal stopper and an external stopper secured to the internal stopper, wherein the internal stopper comprises lugs that extend outwards and downwards, wherein the external stopper comprises, for each lug, a counter-lug that extends inwards and upwards, and wherein the counter-lugs are pressed in beyond the lugs and each lug and the associated counter-lug come vertically facing each other.

5. The assembly according to claim 1, wherein the external perimeter of the neck takes the form of a rectangle with four rounded corners, wherein, at each corner and on the top of the neck, said neck divides into a bottom part extending upwards from the hollow body and a top part extending upwards from the bottom part, wherein at each corner the bottom part has a recess towards the inside to form a shoulder under the top part, wherein the attachment system comprises four attachment lugs secured to the second plate, and wherein each attachment lug is positioned under one of the shoulders of the neck.

6. The assembly according to claim 1, wherein the dispensing unit has a peripheral gadroon in abutment on the first plate and the diameter of which is greater than the diameter of the first window, and wherein each holding lug is positioned so as to be in abutment against a bottom edge of the associated groove.

* * * * *